BRADLY & JORDAN.
Churn.
No. 79,197.
Patented June 23, 1868.
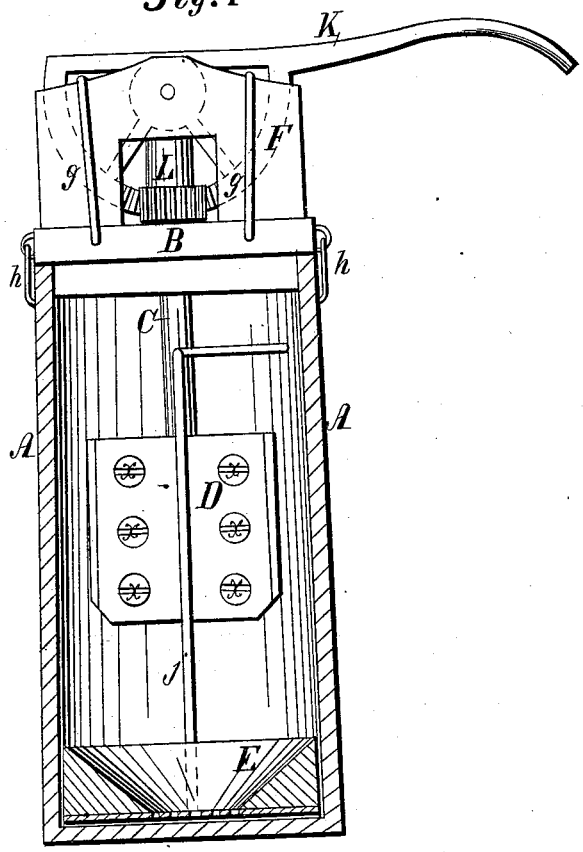
Fig. 1
Fig. 2

United States Patent Office.

JOSEPH W. BRADLY AND GEORGE H. JORDAN, OF ROCHEPORT, MISSOURI.

Letters Patent No. 79,197, dated June 23, 1868.

IMPROVEMENT IN CHURNS.

The Schedule referred to in these Letters Patent and making part of the same.

TO ALL WHOM IT MAY CONCERN:

Be it known that we, JOSEPH W. BRADLY and GEORGE H. JORDAN, of Rocheport, in the county of Boone, and in the State of Missouri, have invented certain new and useful Improvements in Churns; and do hereby declare that the following is a full, clear, and exact description thereof, reference being had to the accompanying drawings, and the letters of reference marked thereon.

In the annexed drawings, making a part of this specification, A represents an ordinary cylindrical churn, and B represents the cover thereof. Projecting upward from and secured to the cover B is a suitable frame, F, the upper cross-bar of which forms a suitable bearing, in which works the upper end of the vertical shaft C. The frame F is supported or strengthened by suitable braces, $g$.

C represents a vertical shaft, having bearings, and working in the cover or lid B and the cross-bar of the frame F, and extends down into the churn A, and sustains and operates the agitator D, which is secured to its lower extremity. Upon the upper end of the shaft C we secure a small pinion, L, by or to which any kind of power may be attached or applied.

The agitator D is made of suitable size to fit and work in the churn A, and provided with perforations or holes, as shown, across the centre of which we secure metallic knives, $x$, with edge on both sides thereof, for the purpose of cutting the fibres of the cream, and thereby producing a more complete and perfect agitation, and mixing up of the milk or cream.

E represents a strainer or device for raising the butter out of the churn A, and is made so as to perfectly fit in the bottom of the churn, made concave on its upper side, and a wire screen or strainer in the middle thereof, so that the buttermilk will run or pass through it, and the butter remain on top or above it. The strainer is provided with a suitable wire handle, $j$, which extends to near the top of the churn, that it may be conveniently drawn out. A hole may be made in the bottom of the churn, and the buttermilk drawn off in the usual way, or not, as desired.

This strainer E and agitator D may be used in a vessel of any required shape or size, when made of a shape to correspond therewith.

K represents a lever, pivoted to the cross-bar of the frame F, and having the segment of a cog-wheel secured to it, which meshes with and operates the pinion L, and thereby the shaft C and agitator D.

Having thus fully described our invention, what we claim as new, and desire to secure by Letters Patent, is—

1. The perforated agitator D, when provided with knives, $x$, and operated as and for the purpose specified.

2. The strainer E, when used in combination with a churn, and constructed as and for the purpose herein set forth.

In testimony that we claim the foregoing, we have hereunto set our hands, this 21st day of January, 1868.

JOSEPH W. BRADLY,
GEORGE H. JORDAN.

Witnesses:
GEO. E. CHINN,
SQUIRE BRADLEY.